United States Patent [19]

Carneiro et al.

[11] Patent Number: 5,010,993
[45] Date of Patent: Apr. 30, 1991

[54] SERVO CONTROL DEVICE FOR A TORQUE COUPLING DEVICE, IN PARTICULAR FOR AUTOMOTIVE VEHICLES

[75] Inventors: Armadno Carneiro, Lyons; Marc Falcoz, Saint-Germain-En Laye; Robert Michel, Mery-Sur-Oise, all of France

[73] Assignee: Valeo, Paris, France

[21] Appl. No.: 464,927

[22] Filed: Jan. 16, 1990

[30] Foreign Application Priority Data

Jan. 16, 1989 [FR] France ................ 89 00427

[51] Int. Cl.$^5$ ........................................... F16D 19/00
[52] U.S. Cl. ................................. 192/84 R; 74/89.14
[58] Field of Search ............... 192/84 R, 94, 99 A, 192/99 S; 74/89.14, 475

[56] References Cited

U.S. PATENT DOCUMENTS 4,648,498  3/1987  Herbulot et al. .................. 192/94

FOREIGN PATENT DOCUMENTS

| 1569566 | 6/1969 | France. |
| 2611615 | 9/1988 | France. |
| 2614661 | 11/1988 | France. |
| 638876 | 10/1983 | Switzerland. |
| 1379416 | 1/1975 | United Kingdom. |
| 2117076 | 10/1983 | United Kingdom .............. 192/84 R |
| 2207969 | 2/1989 | United Kingdom. |

*Primary Examiner*—Allan D. Herrmann
*Assistant Examiner*—Andrea Pitts
*Attorney, Agent, or Firm*—Charles A. Brown

[57] ABSTRACT

A servo control device for a torque coupling device comprises a driving member actuated by an electric motor, and a driven member driven by the driving member and coaxial with it. The electric motor is mounted on a fixed support in a position offset from the axis of the servo device and is coupled through a mechanical connection to the driving member, with the driven member being coupled to the driving member through connecting rods, each of which is pivoted on both the driving member and the driven member. The invention is applicable to automotive use.

10 Claims, 8 Drawing Sheets

SERVO CONTROL DEVICE FOR A TORQUE COUPLING DEVICE, IN PARTICULAR FOR AUTOMOTIVE VEHICLES

FIELD OF THE INVENTION

The present invention is concerned generally with a servo control device for a torque coupling device such as a clutch or brake or the like, and is particularly applicable to automotive vehicles.

BACKGROUND OF THE INVENTION

U.S. Pat. No. 4,648,498 describes a servo control device for modifying the state of the torque coupling device and being carried by a fixed support, the control device being of the kind comprising: an electric motor; a driving member, actuated by the electric motor and being rotatable, but secured against translational movement, with respect to the fixed support; and a driven member, driven by the driving member and being fixed against rotation but capable of translation movement with respect to the fixed support.

The servo device is lodged inside a grooved cartridge which constitutes a tube guide and which is fixed with respect to a radial plate or wheel which is carried on the clutch casing, with the cartridge carrying the electric motor centrally on it. The driving member comprises a lead screw carried by the cartridge, while the driven member comprises a non-rotatable nut which engages with the lead screw.

Such an arrangement, whereby the driven member and driving member are coaxial with each other, is not able to be employed universally, since it cannot be used when the servo device has to be intersected by a shaft. The same is true in the arrangement disclosed in U.S. Pat. No. 4,852,419, in which the driving member and the driven member are not coaxial, which limits the force that can be transmitted.

In order to overcome this disadvantage, it is possible to adopt a hydraulic servo system, as described in French published Patent Application FR-2 165 647A and the corresponding British published Patent Application No. GB 1 379 416A. Such an arrangement is however somewhat costly because of the sealing requirements, and it also calls for the use of expensive electrically operated valves.

SUMMARY OF THE INVENTION

An object of the present invention is to overcome the above disadvantages, and to provide a mechanical servo device in which the driving member and driven member are actuated by an electric motor, but which is of universal application and which can be arranged to act on the torque coupling device with a large force, besides obtaining further advantages.

In accordance with the invention, a servo control device of the type described above is characterised in that the electric motor is mounted on the fixed support in a position offset from the axis of the servo control device, the motor being connected by means of a mechanical connection to the driving member, the driving member and the driven member being mounted in opposed relationship to each other, and the driven member being connected with the driving member through connecting rods, which are distributed circumferentially around the axis of the control device, with each connecting rod being pivoted on both the driving member and the driven member.

The invention enables the servo control device to be traversed centrally by a shaft, and the latter is able to act on the torque coupling device with a high force for a small amount of travel, so as to modify the state of the torque coupling device. This travel may be very small, or even virtually zero. It will be appreciated that such a device has an improved length of useful life, and is well suited for use with torque coupling devices the state of which is liable to frequent modification. This is for example true in the case of a differential transmission, or generally in four wheel drive vehicles of the kind commonly referred to as "4×4" vehicles.

Preferably, the connecting rods are pivoted on the driving member and the driven member through anti-friction rotary means.

According to another feature of the invention, force moderating resilient means, pivotally carried by the fixed support, cooperate with the driving member so as to reduce the controlling force by acting in opposition to further resilient means, namely force control resilient means, which react on the driven member.

Preferably, the force moderating resilient means are mounted under pre-compression in a housing which is pivoted on the fixed support, with the housing cooperating with a projecting finger which is provided on the outer periphery of the driving member for this purpose.

These arrangements enable the electric motor to be of a low power type, the torque transmitted by the force moderating resilient means being increased because the lever arm beneficially increases faster than the spring extends.

The invention is illustrated, by way of example only, in the description of preferred embodiments of the invention which is given below with reference to the accompanying drawings.

DESCRIPTION OF PREFERRED EMBODIMENTS OF THE INVENTION

Figure 1:
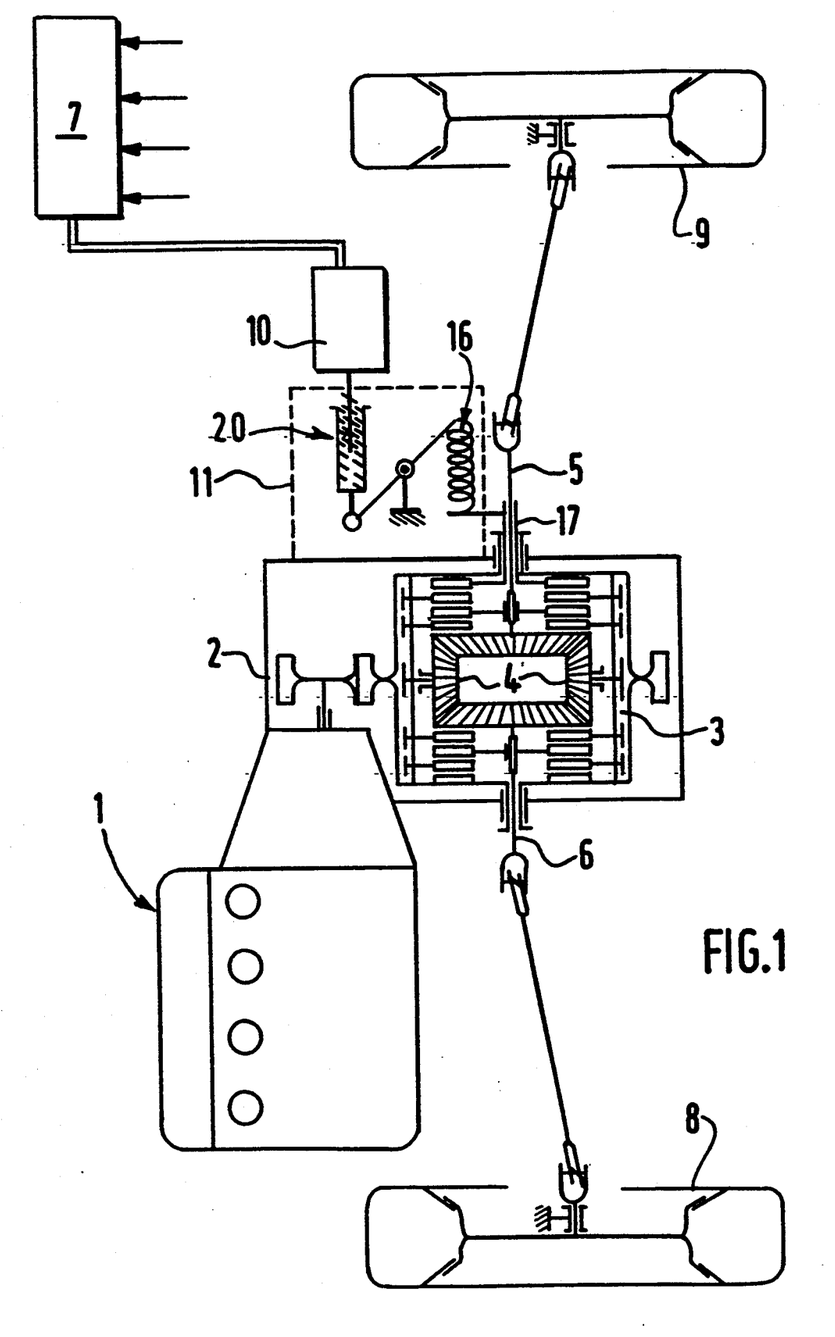
FIG. 1 is a schematic diagram, representing parts of an automotive vehicle generally in plan, the vehicle being one which is equipped with a differential having a variable friction, anti skid braking facility controlled by the servo control device according to the invention.

FIGS. 1 to 5 illustrate in the form of diagrams how the invention can be applied to a differential with a braking facility, adapted in particular for use on automotive vehicles, the example illustrated in FIG. 1 being a front wheel drive road vehicle. The differential comprises a cage 3 incorporating a crown wheel, which is driven by the engine 1 of the vehicle through a pinion 2. The cage 3 carries planetary bevel wheels 4, which mesh with further bevel wheels carried by two half shafts 5 and 6. The half shafts are coupled with the front road wheels 8 and 9 respectively so as to drive the latter.

A friction coupling is provided between the crown wheel 3 and each of the half shafts 5 and 6. In this example, this coupling takes the form of a multi-disc clutch, with some of its friction discs being rotatable with the crown wheel 3 and others being rotatable with the half shafts 5 and 6. Torque transmission is obtained by mutual gripping between the clutch friction discs.

A computer 7 receives data relating to the dynamic behaviour of the vehicle, in particular through sensors which detect the speed of rotation of the road wheels 8 and 9. The computer 7 controls an electric motor 10 which drives two coaxial members 12 and 13 of the control device, which will be referred to respectively as the "driving member" and the "driven member" in this description.

In more detail, FIGS. 1 to 5 illustrate a servo control device for a torque coupling device (which in general terms may be a clutch or a brake or the like), the control device being adapted to modify the state of the coupling device and being carried by a fixed support 11. This control device comprises: the electric motor 10; the driving member 12, which is driven by the electric motor 10 and which is rotatable, but fixed against any translational movement, with respect to the support 11; and the driven member 13, which is driven by the driving member 12. The driven member 13 is secured against rotation, but is arranged to undergo translational movement, with respect to the fixed support 11. The axis of the motor 10 is offset radially from the axis X—X' (see FIGS. 6, 8 and 11) of the control device, i.e. the common axis of the members 12 and 13, and is coupled to the driving member 12 by means of a mechanical connection 20. The driving member 12 and driven member 13 lie opposite to each other, and are coupled together through a set of connecting rods 14 which are distributed circumferentially around the axis of the servo device, with each connecting rod being pivoted to both the driving member 12 and the driven member 13.

The servo control device may (as it is in the embodiments shown in FIGS. 6 to 12) be intersected by a shaft such as the half shaft 5, so that rotational movement of the driving member 12 is converted into controlled translational movement of the driven member 13, while the spacing between the driving and driven members is varied.

First resilient means 15, for force moderating purposes, are carried pivotally by the fixed support 11, and cooperate with the driving member 12 in order to reduce the controlling force by acting in opposition to a second resilient means 16, namely a force control resilient means, which react on the driven member 13.

As indicated in FIGS. 2 to 5, the resilient means 16 and 15 are arranged in orthogonal planes, with the force moderating means 15 being mounted under pre-compression. The mechanical connection 20 comprises a worm 21 and a toothed portion 22, which is formed on the outer periphery of the driving member 12 and which meshes with the worm 21.

In this example, the toothed portion 22 is profiled like a screw thread. It will be seen that the connection 20 comprises an irreversible worm and worm wheel type coupling acting tangentially on the driving member 12.

Three connecting rods 14 are distributed regularly around the axis of the servo device, their pivot points being indicated diagrammatically.

Figures 2, 4:
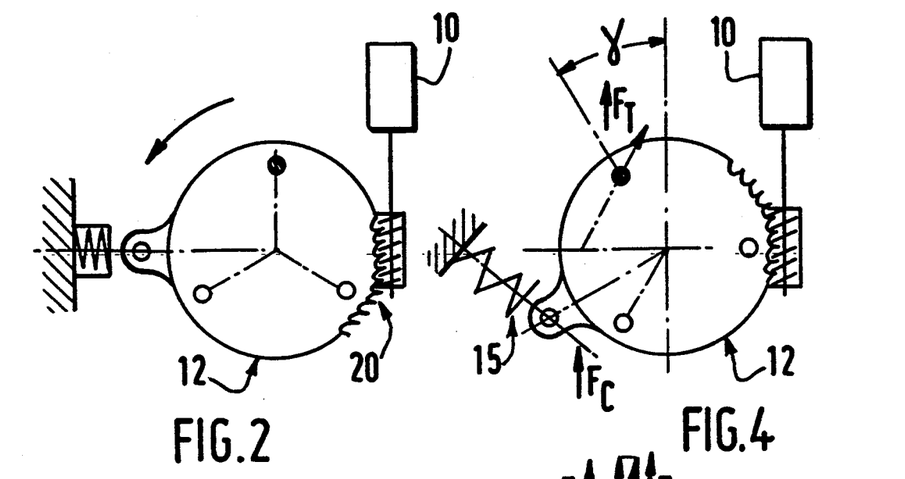
FIGS. 2 and 3 are diagrammatic views of the servo control device according to the invention, shown in its normal or rest position.
FIGS. 4 and 5 are views similar to FIGS. 2 and 3, but show the servo control device in another position.
Figure 3:
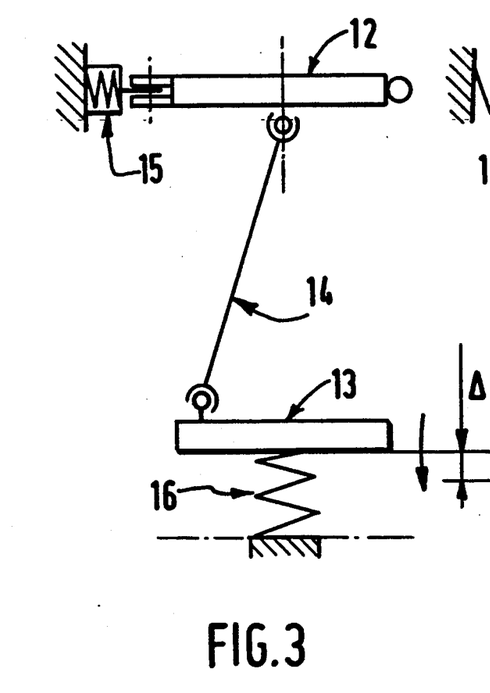
Figure 5:
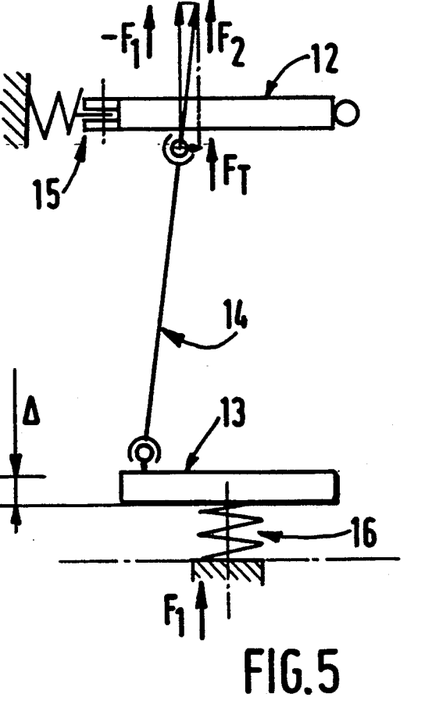

During displacement of the driving member 12, the resilient means 15 (represented as a spring) tilts as indicated in FIG. 4, exerting a force Fc on the member 12 in such a way that the motor 10 has only to exert a small driving effort in order to displace the driving member 12 and compress the second or force control resilient means 16. As will be noted, there is an increase in the lever arm (connecting rock 14) which takes place at a greater rate than that with which the spring 15 extends, so that the torque transmitted by the spring 15 increases. The geometry of the servo device and the stiffness of the spring 15 are chosen accordingly, as will be described later herein.

Figure 6:
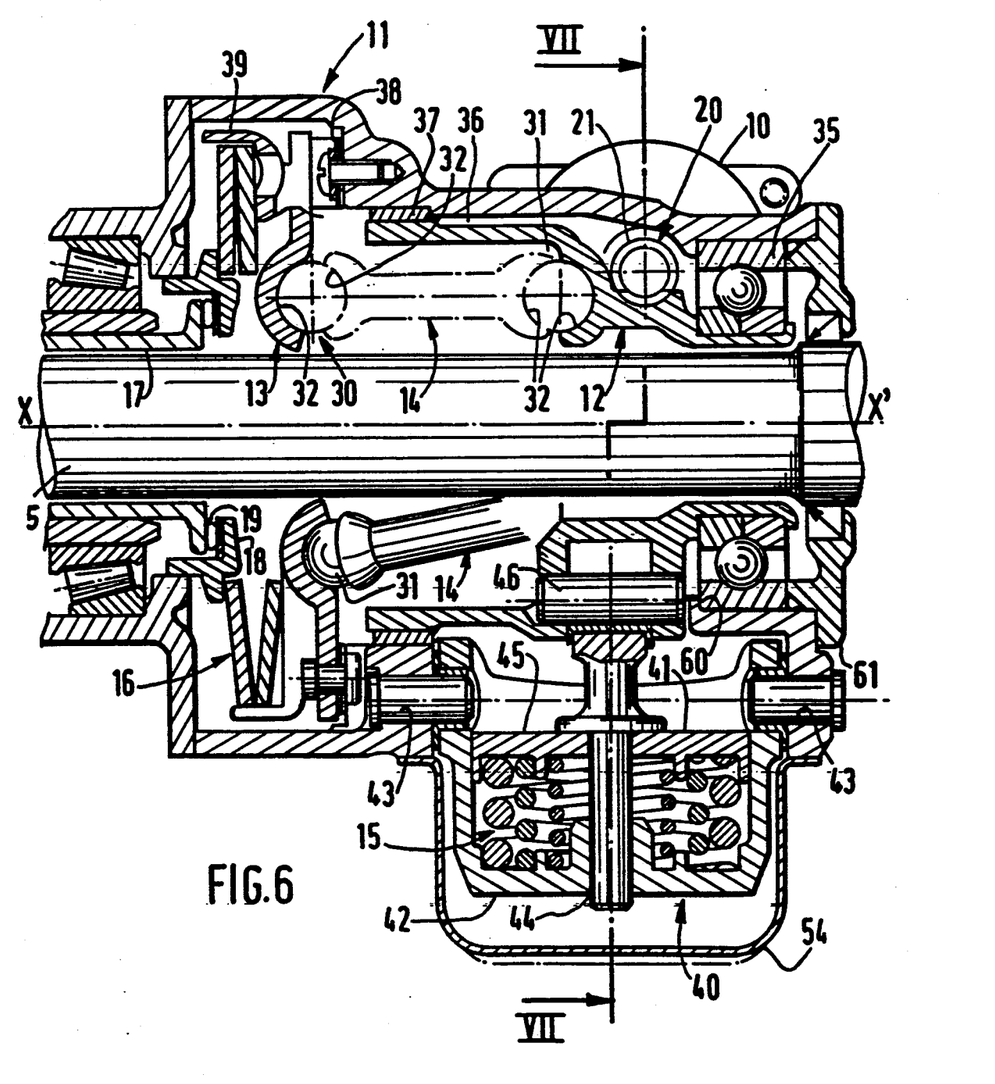
FIG. 6 is a view in axial cross section, showing a first embodiment of the servo control device.
Figure 7:
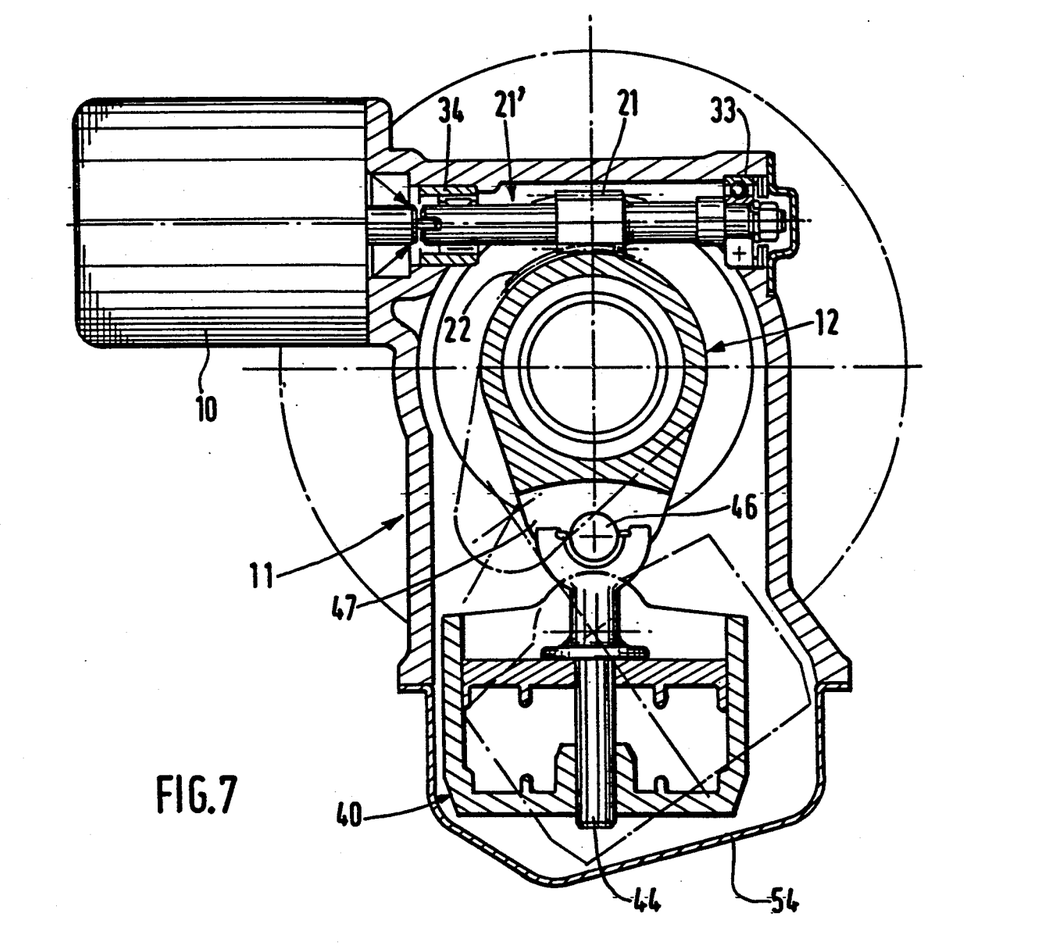
FIG. 7 is a view in cross section taken on the line VII—VII in FIG. 6.

Reference is now made to FIGS. 6 and 7, in which the connecting rods 14 are indicated in phantom lines in a working position. It will be seen that these connecting rods are pivoted on the members 12 and 13 through low friction rotary joints 30. In this example, these rotary joints 30 comprises balls 31 fixed in housing elements 32, each of which is provided locally in the form of recesses, one between the associated connecting rod 14 and the driven member 13 and the other between the connecting rod 14 and the driving member 12. The recesses 32 are formed in transversely extending wall portions, facing each other, of the driving member and the driven member respectively.

Two ball bearings 33 and 34, mounted in the fixed support 11, carry a spindle 21', having a central portion which is radially enlarged to form the worm 21. The driving member 12 has its toothed zone 22 formed at its outer periphery. The worm 21 and toothed zone 22 together constitute the mechanical connection 20.

The fixed support 11 is in the form of a housing having several components, which carries the motor 10 and which is intersected by the half shaft 5. The driving member 12 is mounted in the fixed support 11 by means of a ball bearing 35 having a divided inner bearing ring, such that the member 12 is free to rotate but is secured against translational, i.e. axial, movement with respect to the fixed support 11. The ball bearing 35 is interposed radially between the support 11 and a journal surface of the member 12, which is fitted tightly within the bearing. The outer bearing ring of the bearing 35 bears against a shoulder 60 of the fixed support 11, while a thrust member 61, fixed on the support 11, abuts axially on this outer bearing ring.

The driving member 12, which is annular in shape like the driven member 13, includes an axial extension 36 which surrounds the connecting rods 14, and which carries a plain bearing 37 interposed radially at the outer end of the extension 36, between the fixed support 11 and the extension 36. It will be noted that the connection 20 is protected, in particular from dust, by the fixed support 11 surrounding it, and that the toothed zone 22 is disposed close to the balls 31.

The driven member 13 is hollow in the middle like the driving member 12, and is mounted in the fixed support 11 by means of tangentially extending tabs 38, each of which is fixed at one end to the support 11 and at the other end to the member 13, so that the latter is secured against rotation, but free to move axially in translational movement, with respect to the support 11. The driven member 13 is generally in the form of a disc, and carries a support 39 which locates, centrally in the member 13, the second, or force control, resilient means 16. In this example the latter comprises two Belleville springs mounted back to back, so as to bear against each other at their outer periphery. At their inner periphery, these Belleville springs bear respectively on the support 39 and on a thrust member 18 (see lower part of FIG. 6), which is connected to a rotatable actuating member 17 of the torque coupling device, for modifying the state of the coupling given by the latter through variation of the strength of the gripping force exerted between the friction discs. An axial thrust bearing, in the form of a needle bearing 19, is interposed between the members 18 and 17.

The first, or force moderating, resilient means 15 are mounted in a capsule 40, comprising a hollow cup-shaped base 42 and an end plate 41 which is moveable with respect to the base 42. The capsule 40 is pivoted by its base 42 on the support 11, in this example at the upper part of the capsule by means of trunnions 43 carried by the fixed support 11. The latter includes a cover 54 which encloses the capsule 40. A spindle 44 extends centrally through the end plate 41 and base 42, and has a head in the form of a flange which bears on the outer face 45 of the end plate 41. The spindle 44 is pivotally mounted on the driving member 12 by means of transverse pivot pins 46 carried by the driving member 12.

The resilient means 15 themselves comprise a plurality of coil springs, mounted one inside another, and the end plate 41 and base 42 have seatings, defined by grooves, for receiving these springs. The springs 15 are mounted within the capsule 40, in a pre-compressed condition which is preferably determined in accordance with the position of the axes of the pivots at 43 and 46. The axes of the trunnions 43 and pivot pins 46 extend parallel to the main axis X—X' of he servo device, and thus parallel also to the half shaft 5 with the axis of the pivot pins 46 being radially closer to the axis of the assembly than the pivot axis 43. It will be appreciated that, by varying the distance between the pivot axes 43 and 46 on the one hand and the axis X—X' on the other, the force exerted by the springs 15 on the driving member 12, and thus the compensating force and the force exerted by the motor, can be modified.

It will be noted that the driving member 12 includes a projecting finger 47, which is generally in a position diametrically opposed to the toothed portion 22. The finger 47 carries the pivot pins 46, which project on either side of its mid plane at the outer periphery of the driving member.

FIG. 7 shows in phantom lines the position of the driving member, and that of the capsule 40, when the servo device is in its working position, while its rest position is indicated in hatched lines in FIG. 7 and in the lower part of FIG. 6.

Figures 8, 10:
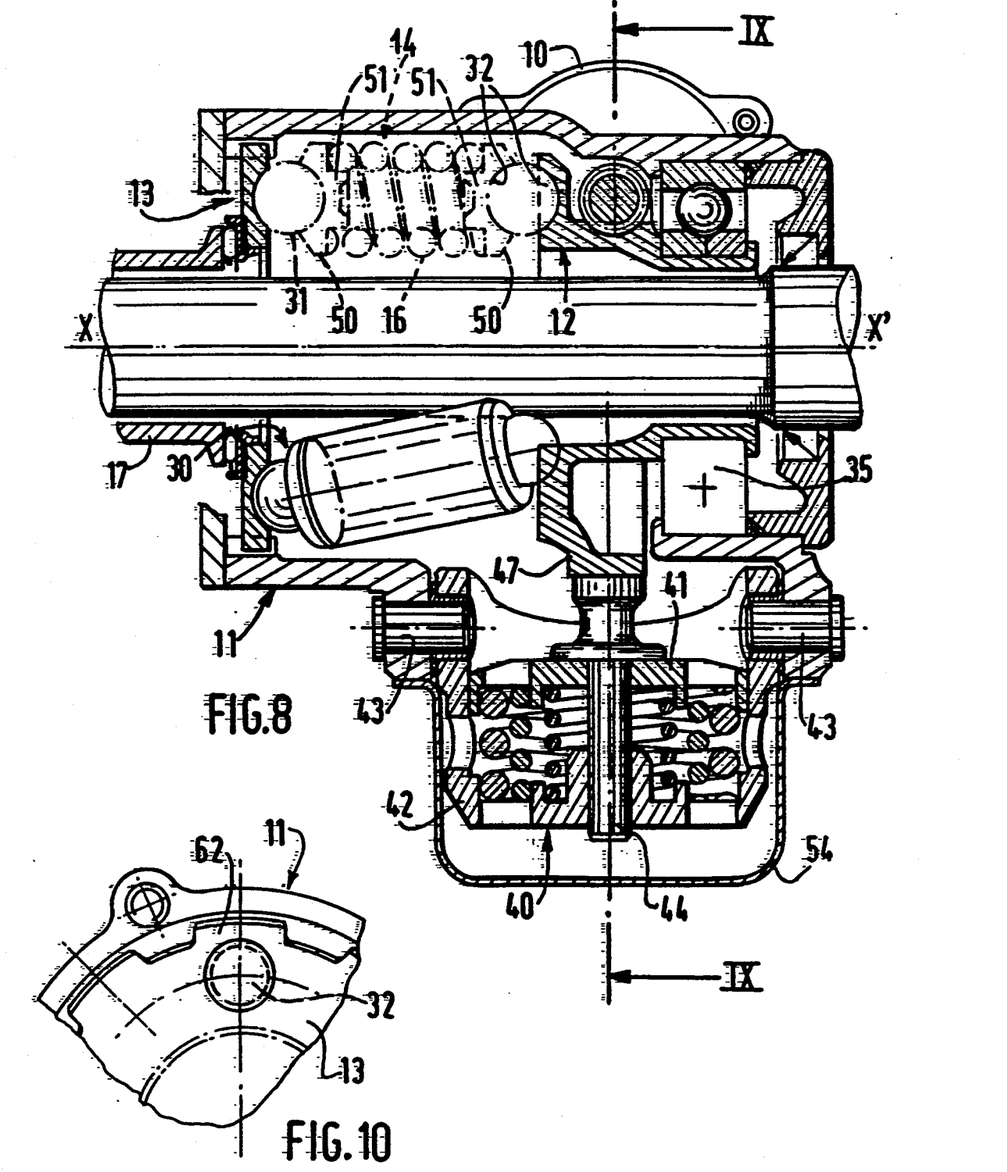
FIGS. 8 and 9 are views similar to FIGS. 6 and 7, but show another embodiment.
FIG. 10 is a partial front view, showing how the driven member of the control device is coupled to its support in the rotational sense.
Figure 9:
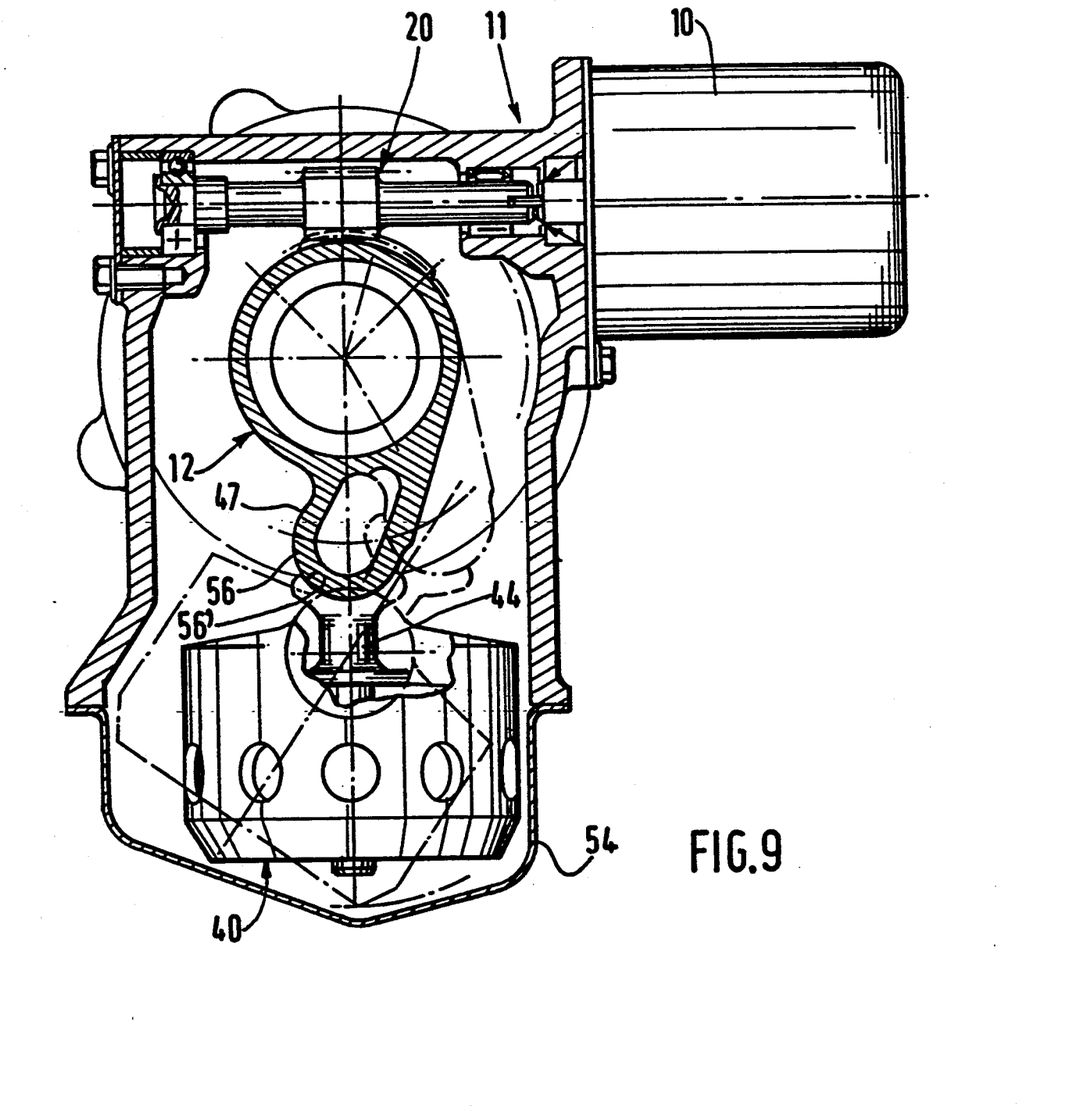

In FIGS. 8 to 10, the second resilient means 16 for force control purposes are made part of the connecting rods 14. In this case, the resilient means 16 comprise a plurality of coil springs (one to each connecting rod), bearing at each of their ends on thrust inserts 50, which may for example be of plastics material. The outer face of each insert 50 is formed with the appropriate recesses 32 in which the balls 31 are lodged. A pin 51 projects from each insert 50 and serves for centring the end of the associated spring 16. In a modification, the two inserts 50 associated with a spring 16 may be arranged in a "piston and cylinder" relationship, with an axial sleeve portion on one of the inserts extending into an axial sheath portion of the other insert. This arrangement prevents any buckling of the spring 16.

The driven member 13 is in the form of an annular disc in this example, and is connected to the fixed support 11, for rotation therewith, by means of a splined connection 62, as is best seen in FIG. 10. The member 13 has, for this purpose, a transverse wall portion provided with recesses 32 facing towards a transverse wall portion, which is provided with further recesses 32, of the driving member 12. The head of the spindle 44 cooperates with the finger 47 through a profiled connection (FIG. 9), whereby the finger 47 has a rounded end 56 cooperating with a complementary recess 56' formed on the spindle 44.

Figure 11:
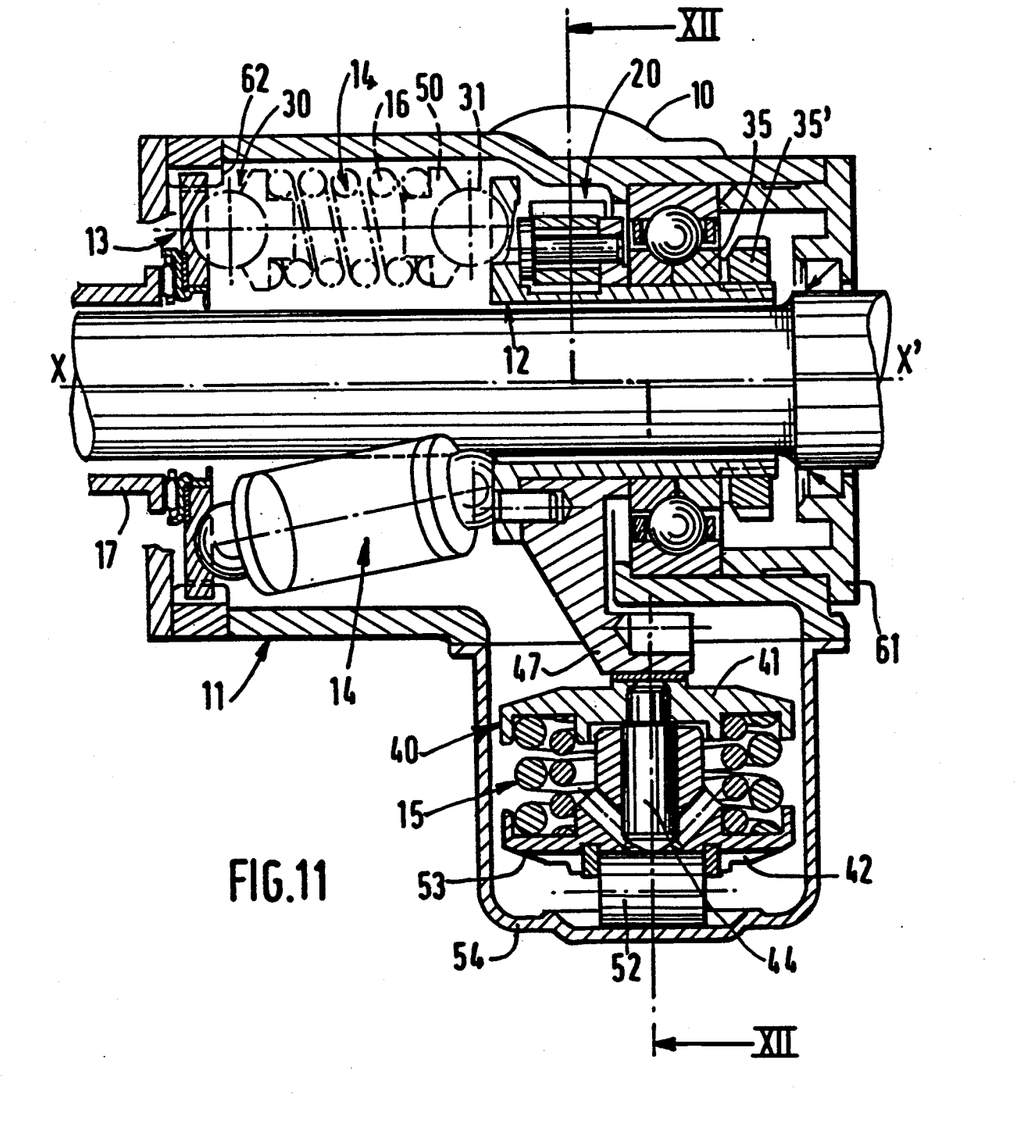
FIGS. 11 and 12 are views similar to FIGS. 6 and 7, but show yet another embodiment.
Figure 12:
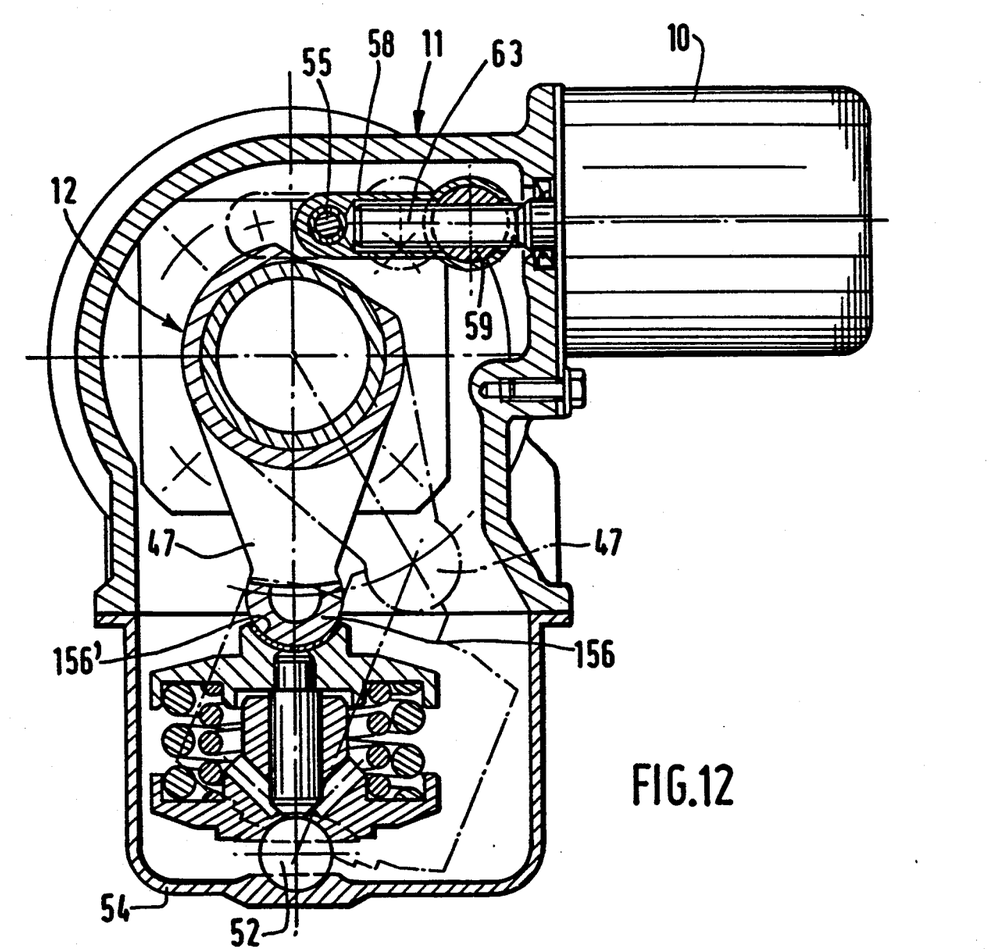

In FIGS. 11 and 12, the ball bearing 35, instead of being secured by means of an interference fit, is secured by a screw 35', for which purpose the driving member 12 is threaded at its end. The end plate 41 of the capsule 40 here cooperates directly with the finger 47 through a profiled connection, while its base 42 is pivoted at its outer end to the fixed support 11, by means of a pivot element 52 having its axis parallel to the axis X—X' of the assembly. The pivot element 52 is interposed between the outer face 53 of the base 42 and the cover 54 which is fixed to the fixed support 11.

The mechanical connection 20 comprises a screw and nut system which can be seen in FIG. 12. This is as follows. The driving member 12 carries an axis 55, which is in a position generally diametrically opposed to the finger 47. The latter has a rounded end 156 for cooperation with the complementary recess 156' of the end plate 41, as described above. A sheath portion 58 is pivoted on the axis 55, and carries at its other end a threaded nut 59, with which a lead screw 63 driven by the motor 10 engages. In this way, the driving member 12 is coupled to the motor 10 through a lead screw and nut device which acts tangentially on the driving member 12.

In all cases, the mechanical connection 20 is disposed at the outer periphery of the driving member 12, with the electric motor 10 being disposed in an offset position from the axis of the servo device. When the motor drives the driving member 12, the later, by means of its finger 47, causes the capsule 40 to tilt, thus causing the force moderating resilient means 15 to operate. At the same time, the rotation of the driving member 12 induces rotation of the connecting rods 14, and thus a change in the distance between the driving member 12 and the driven member 13. This is best seen, in particular, in FIGS. 2 to 5. It will be noted that, during the movement of the driving member, the spindle 44 allows the end plate 41 to undergo relative displacement with respect to the base 42, while the precompressed springs 15 tend to relax as the lever arm becomes larger.

In all cases, the capsule 40 is disposed perpendicularly to the axis X—X' of the servo device, while the force control resilient means 16 are disposed around the axis X—X'.

The finger 47 is of course not necessarily arranged opposite to the toothed zone 22, and the motor 10 may be moved circumferentially with respect to the finger 47, in any convenient way having regard to space requirements.

It will be appreciated that, in all cases, a large force may be transmitted to the actuating member 17, and therefore to the torque coupling, so as to modify the state of the latter by varying in either direction the gripping force between the friction discs of the torque coupling. It will also be appreciated that the amount of movement carried out by the driven member 13 may be small or nearly zero. The number of connecting rods 14 and springs 16 that are employed may be varied according to particular applications, and according to the forces which are to be transmitted.

The present invention is of course not limited to the embodiments shown. In particular, the ball bearing 35 may be replaced by two oblique contact bearings, or by an anti-friction bearing, while the connecting rods 14 may have a hemispherical end or head for cooperation with seatings or recesses, of complementary shape, formed in the driven member and driving member.

In place of a variable, friction type differential, the servo device may carry a declutching member for acting on a diaphragm constituting the resilient force control means, in the manner described in the above mentioned U.S. Pat. No. 4,648,498.

Finally, the servo device according to the invention, instead of having a shaft passing through it, may be mounted endwise on the device which is to be controlled, as in U.S. Pat. No. 4,648,498. In that case, the driving member and driven member can beneficially be made solid.

What is claimed is:

1. A servo control device for modifying the state of a torque coupling device, wherein the control device comprises:
   a fixed support defining a main axis of the device;
   an electric motor mounted on the fixed support in a position offset from the main axis;
   a driving member and a driven member;
   means mounting the driving member in the fixed support for movement with respect to the latter in a rotational sense only;
   means mounting the driven member in the fixed support coaxially, and in opposed relationship, with the driving member, for movement with respect to the fixed support in a translational sense only;
   a mechanical connection coupling the electric motor with the driving member for actuating the latter;
   and a plurality of elongated connecting members distributed circumferentially around the main axis, each of the driving member and driven member having a plurality of pivot means each mounting a respective end of a connecting member thereon, whereby each elongate connecting member is pivoted to both the driving member and the driven member so that the driving member can drive the driven member through the connecting members.

2. A servo control device according to claim 1, further comprising anti-friction rotary means pivoting the elongate connecting members on the driving member and the driven member.

3. A servo control device according to claim 2, wherein the anti-friction rotary means comprise a plurality of first seatings, each disposed between a respective one of said connecting members and the driven member, a plurality of second seatings each disposed between a respective one of said connecting members and the driving member, and a plurality of balls, each interposed between a respective first seating and a corresponding second seating.

4. A servo control device according to claim 1, further comprising force control resilient means interposed between the driven member and the driving member and forming part of the elongate connecting members.

5. A servo control device according to claim 4, further comprising a plurality of thrust inserts carrying the force control resilient means.

6. A servo control device according to claim 3, further comprising force control resilient means interposed between the driven member and the driving member and forming part of the elongate connecting members, and a plurality of thrust inserts, each defining on one of its faces a said seating profiled to receive a respective one of said balls, the force control resilient means being interposed axially between said thrust inserts.

7. A servo control device according to claim 1, further comprising force moderating resilient means, force control resilient means interposed between the driving member and the driven member so as to react on the latter, and pivot means on the fixed support, pivotally carrying the force moderating resilient means for cooperation of the latter with the driving member, so as to reduce a controlling force by acting against the force control resilient means reacting on the driven member.

8. A servo control device according to claim 7, further comprising a capsule mounting the force moderating resilient means therein, and means mounting the capsule for rotation with respect to the fixed support, the driving member including a finger for cooperating with the capsule.

9. A servo control device according to claim 8, wherein the capsule comprises an end plate and a base, the force moderating resilient means being interposed between the end plate and base, the device further having means mounting the base in the fixed support for pivoting movement about the axis of the servo control device.

10. A servo control device according to claim 1, further comprising mechanical coupling means connecting the electric motor with the driving member, for acting tangentially on an outer periphery of the driving member, the driving member and the driven member being hollow.

* * * * *